United States Patent [19]

Jones

[11] Patent Number: 5,019,019

[45] Date of Patent: May 28, 1991

[54] PULLEY TIRE RIM CONFIGURATION

[76] Inventor: Harry A. T. Jones, 85 Dunstan Street, Bunbury, Western Australia, Australia, 6230

[21] Appl. No.: 466,254

[22] PCT Filed: Aug. 19, 1988

[86] PCT No.: PCT/AU88/00314

§ 371 Date: Feb. 28, 1989

§ 102(e) Date: Feb. 28, 1989

[87] PCT Pub. No.: WO89/02046

PCT Pub. Date: Mar. 9, 1989

[30] Foreign Application Priority Data

Aug. 28, 1987 [AU] Australia ................. PI4043

[51] Int. Cl.$^5$ ................. F16G 1/08; F16H 55/36
[52] U.S. Cl. ................. 474/166; 474/167; 474/268
[58] Field of Search ............ 474/166, 167, 174, 177, 474/178, 190–192, 237, 265, 268

[56] References Cited

U.S. PATENT DOCUMENTS

| | | | |
|---|---|---|---|
| 2,884,797 | 5/1959 | Murray | 474/167 |
| 3,177,733 | 4/1965 | Yamano | 474/191 X |
| 3,633,432 | 1/1972 | Horsey | 474/191 X |
| 3,707,883 | 1/1973 | Kamenick | 474/191 X |
| 4,299,018 | 11/1981 | Brickerstaff et al. | 474/187 X |

FOREIGN PATENT DOCUMENTS

| | | |
|---|---|---|
| 513947 | 11/1930 | Fed. Rep. of Germany . |
| 2136167 | 2/1973 | Fed. Rep. of Germany . |
| 1265904 | 11/1961 | France . |
| 376725 | 5/1964 | Switzerland . |
| 1125738 | 8/1968 | United Kingdom . |
| 2036919 | 7/1980 | United Kingdom . |

OTHER PUBLICATIONS

Semperit Brochure, "Seilrollenfutterungen" (publishing date unknown).
Malloya Brochure, "Gummi-Einlagering mit Stahlcord-Einlage" (publishing date unknown).

Primary Examiner—Thuy M. Bui
Attorney, Agent, or Firm—Eckert Seamans Cherin & Mellott

[57] ABSTRACT

A pulley comprising a hub (12) having a substantially cylindrical outer face and a pair of rim halves (11a and 11b) adapted to be mounted to the hub and having opposed inner axial faces which are divergent with respect to each other, a separable pulley tire (13) having a cross-sectional configuration corresponding substantially to the space defined between the hub and the inner axial faces of the rimmed halves and having an inner circumference where by the tire is snugly received on the hub and is clampingly received between the rim halves said tire having a reinforcing ring (15) located at or adjacent the inner circumference of the tire, the outer circumference of the tire being formed with a peripheral groove (14) for accommodation of a rope or cable.

61 Claims, 2 Drawing Sheets

PULLEY TIRE RIM CONFIGURATION

This invention relates to pulleys and in particular pulleys which have a peripheral recess or groove for receiving a rope or cable.

Prior art pulleys are exemplified by the disclosure in GB No. 1125738 where the rim comprises a pair of opposed rim halves which are fixed to a hub to form the outer half of the pulley. Each rim half has bonded thereto a half tire section which when the rims are bolted to the hub together form a complete tire having a peripheral recess for accommodation of a rope or cable which is substantially concentric with the surface of the rim halves and hub.

The difficulties with the prior art as described above have resulted from the interface between the two tire halves fracturing due to the lack of continuation of the section and support provided at the junction therebetween.

In one form the invention resides in a pulley comprising a hub having a substantially cylindrical outer face and a pair of rim halves adapted to be mounted to the hub and having opposed inner axial faces which are divergent with respect to each other, a separatable pulley tire having a cross-sectional configuration corresponding substantially to the space defined between the hub and the inner axial faces of the rimmed halves and having an inner circumference whereby the tire is snugly received on the hub and is clampingly received between the rim halves said tire having a reinforcing ring located at or adjacent the inner circumference of the tire, the outer circumference of the tire being formed with a peripheral groove for accommodation of a rope or cable.

According to a preferred feature of the invention the tire is formed from an elastomeric material.

According to a further preferred feature of the invention a layer of elastomeric material is located between the inner circumference of the reinforcing ring to define the inner circumference of the tire.

According to a preferred feature of the previous feature the layer of elastomeric material has a greater resilience and/or may be less hard than the elastomeric material forming the pulley tire.

According to a further preferred feature of the invention the axial faces of the tire are formed of an elastomeric material of contrasting colour to the elastomeric material forming the body of the tire.

According to a preferred feature of the previous feature the elastomeric material at its outer axial faces of the tire have a greater strength or hardness than the elastomeric material forming the body of the tire.

According to a preferred feature the reinforcing ring is formed of an elastomeric material of similar composition to that of the tire but having a greater strength or hardness.

According to a preferred feature of the previous feature the reinforcing ring extends over the inner circumference of the tire and partially over each axial face.

According to a further preferred feature the axial faces of the tire are formed of an elastomeric material having a greater strength or hardness than the elastomeric material forming the main body of the tire and a further layer of elastomeric material is located between the inner circumference of the tire and reinforcing means and is formed of a material having a differing strength or hardness from the main body of the tire.

A further difficulty of the prior art resides in the feature that a large portion of the cross sectional area of the tire is occupied by the peripheral groove and therefore the degree of wear which can be tolerated before the rope or cable engages the rim half is significantly reduced.

According to a further preferred feature of the invention the cross sectional area of the peripheral groove is less than half of the overall cross sectional area of the tire.

According to a further preferred feature of the invention the peripheral groove can be located to one side of the outer circumference of the tire.

In another form the invention resides in a pulley tire which is be received on a hub having a substantially cylindrical outer face and between a pair of rim halves which are adapted to be mounted to each axial face of the hub whereby the opposed inner axial faces of the rim halves are in opposed relation to each other and are divergent with respect to each other, said tire having an inner circumference whereby the tire is snugly received over the hub and the lateral dimensions of the tire being such that the tire is clampingly received between the rim halves, said tire being formed of an elastomeric material and having a reinforcing ring located at or adjacent the inner circumference of the tire, the outer circumference of the tire being formed with a peripheral groove which is adapted to receive a rope or cable.

According to a further preferred feature of the invention the cross sectional configuration of the tire is substantially trapezoidal and the cross sectional configuration of the peripheral groove is substantially circular.

The invention will be more fully understood in the light of the following description of one specific embodiment. The description is made with reference to the accompanying drawings of which:

Figure 1:
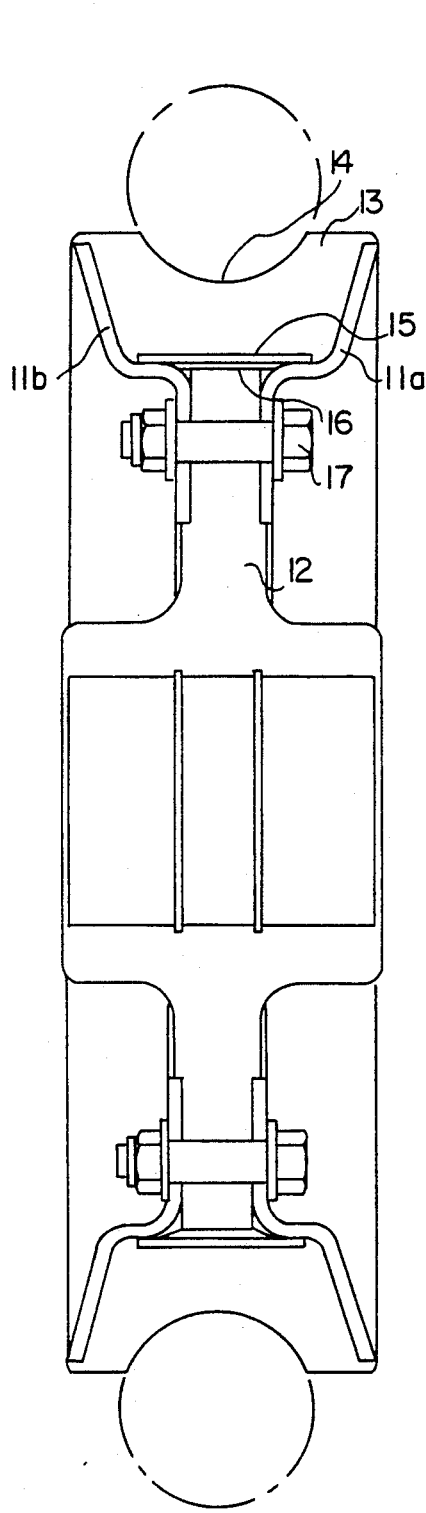
FIG. 1 is a cross sectional elevation of a pulley according to the embodiment.

The embodiment shown at FIG. 1 comprises a pulley having a substantially circular pulley hub 12 which is adapted to be received upon a support shaft (not shown). The outer circumference of the hub 12 is substantially cylindrical. The hub supports a pair of rim halves 11a and 11b in substantially opposed relationship whereby the inner axial face of the rim halves are opposed to each other and are divergent with respect to each other to define a substantially trapezoidal space between themselves and the hub outer circumference. The rim halves are retained on the hub by means of bolts 17 or similar fixing means. The pulley of the embodiment further comprises a tire which is formed of an elastomeric material such as polyurethane and has a cross-sectional configuration which is substantially complementary to the trapezoidal space defined between the hub 12 and the rim halves 11a and 11b and which is itself substantially trapezoidal. The inner circumference of the tire is such that the tire is snugly received over the hub 12 while the lateral dimensions of the tire and the configuration between the inner circumference of the tire and the outer axial faces facilitate clamping engagement of the tire 13 between the rim halves 11a and 11b. The outer circumference of the tire is formed with a peripheral groove 14 of substantially part circular configuration which is adapted to receive a pulley rope, cable, belt or the like. The cross sectional area of the peripheral groove 14 is significantly less than the cross sectional volume of the tire whereby the sides of the peripheral groove are spaced significantly from the sides of the tire and the base of the groove 14 is spaced a significant distance from the base of the tire. The tire accommodates a reinforcing ring 15 which is located adjacent the inner circumference of the tire and may be formed of any suitable reinforcing material such as metal, a fabric web, a metal mesh or alternatively of an elastomeric material similar to that of the main body of the tire but of a greater strength or hardness. The inner circumference of the tire is spaced inwardly from the reinforcing ring 15 and is formed of an inner layer 16 formed of the same elastomeric material of the main body of the tire which may be softer and/or move resilient than the main body of the tire.

On assembling a pulley according to the embodiment the tire is snugly fitted over the outer circumference of the hub 12 and the rim halves 11a and 11b are mounted to the hub 12 by utilisation of the fixing means 17 and are brought into clamping engagement with the hub. As a result the tire is snugly clamped the tire therebetween the rim halves. Because of the tapered complementary configuration of the side walls of the tire and the rim halves any radially inward force applied to the tire by a pulley rope serves to bring the tire into greater clamping engagement with the rim halves 11a and 11b. The annular reinforcing rings 15 serves in preventing tangential extrusion of the tire an application of the radial inward force which would otherwise result in deformation and stretching of the tire and subsequent disengaging of the tire from the hub and rim halves. The inner layer 16 of elastomeric material defines a locking ring which serves in insulating the pulley rim halves and the hub from any vibration created by engagement of the tire with a pulley rope and serves in ensuring a strong frictional engagement between the outer circumference of the hub 12 and the inner circumference of the tire 13.

Due to the differing geometric configurations of the tire and the peripheral groove 14 and the significant difference between the cross sectional area of the peripheral groove 14 and the tire 13 the walls of the peripheral groove are spaced significantly from the inner circumference of the tire and the outer axial faces of the tire. As a result of such as the tire wears in use the groove will increase in its dimensions either downwardly or laterally or both downwardly and laterally and a greater volume of material is available for wear before the walls of the peripheral groove encounter the ring halves 11a and 11b.

Figure 2:
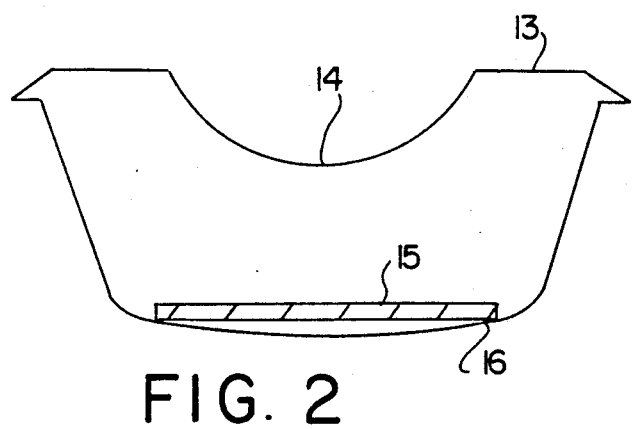
FIG. 2 is a cross sectional elevation of a tire according to the embodiment of FIG. 1.

The form of the tire shown at FIG. 1 is illustrated at FIG. 2. It should be appreciated that the inner layer 16 of elastomeric material which defines the locking ring of the tire may be formed of the same elastomeric material as that forming the body of the tire or alternatively it may be formed of a softer or harder elastomeric material if desired.

If desired the axial outer faces of the tire may be formed of an elastomeric material having the same hardness as that of the main body of the tire but of a differing and/or contrasting colour to provide an indication of wear.

Figure 3:
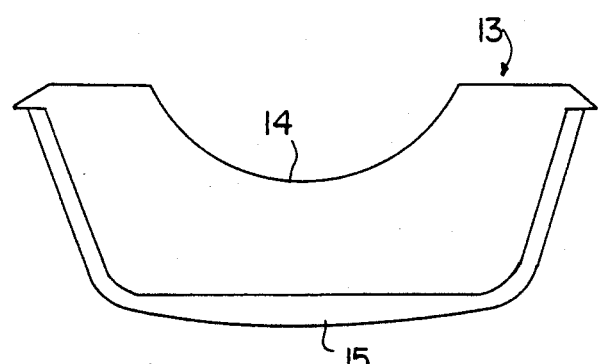
FIG. 3 is a cross sectional elevation of an alternative form of tire.

A second alternative form of the tire is shown at FIG. 3 where the reinforcing ring 15 is located at the inner circumference of the tire and is formed of a similar elastomeric material to that of the main body of the tire but a material having a greater strength or hardness. In addition the reinforcing ring 15 extends over the inner circumference of the tire and over each axial face. If desired the material which forms the reinforcing ring 15 also has a contrasting colour to that of the main body of the tire. This feature provides a visual indication when the peripheral groove 14 has worn to such an extent that it extends to the reinforcing ring.

Figure 4:
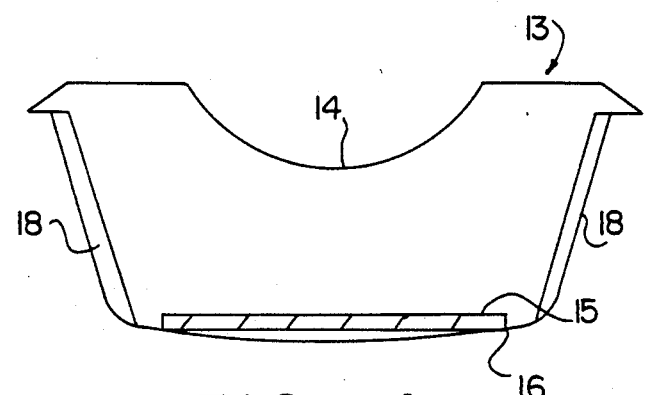
FIG. 4 is a cross sectional elevation of a third alternative form of tire.

A third alternative form of tire is shown at FIG. 4 and comprises a variation of the tire as shown at FIG. 2 where the axial faces 18 of the tire are formed with an elastomeric material having a greater hardness or strength to provide for additional reinforcement. In addition if desired the elastomeric material formed on each axial face may have a differing colour to provide an indication of wear.

Figure 5:
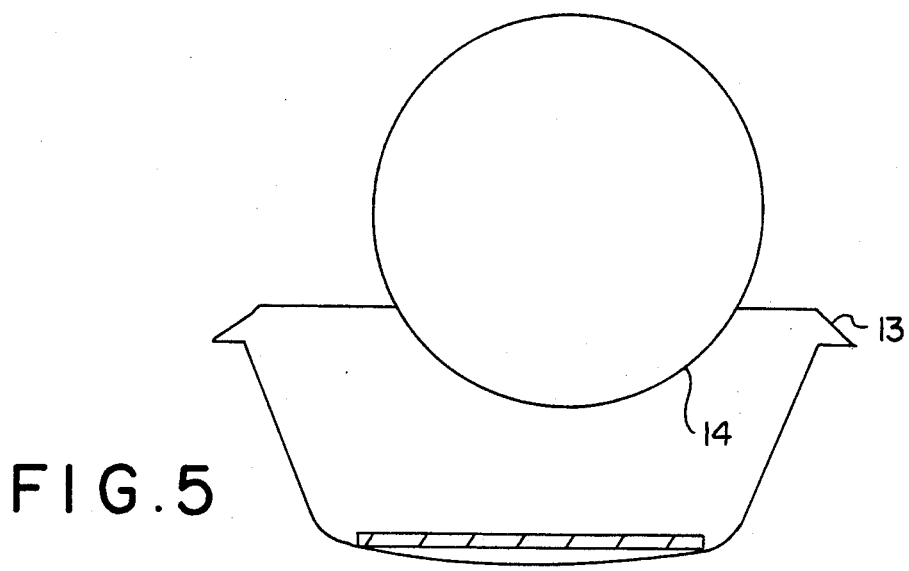
FIG. 5 is a cross sectional elevation of a fourth alternative form of tire.

It is a property of rope pulley systems that due to the twist in the rope that on the rope passing over a pulley the rope has an inherent tendency to move to one side of the pulley and cause greater wear to one side of the pulley. This tendency can be enhanced by the geometry of the pulley system. In such cases it may be preferable to locate the peripheral groove towards the opposite side of the tire to the direction in which the pulley is likely to wear in order to increase the volume of material available for wear as shown in FIG. 5.

Figure 6A:
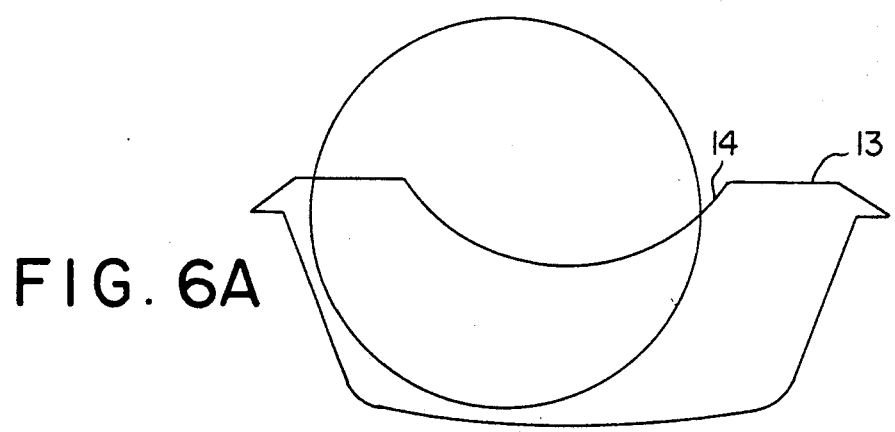
FIGS. 6a and 6b are comparative drawings of the tire according to the embodiment and according to the prior art referred to above.
Figure 6B:
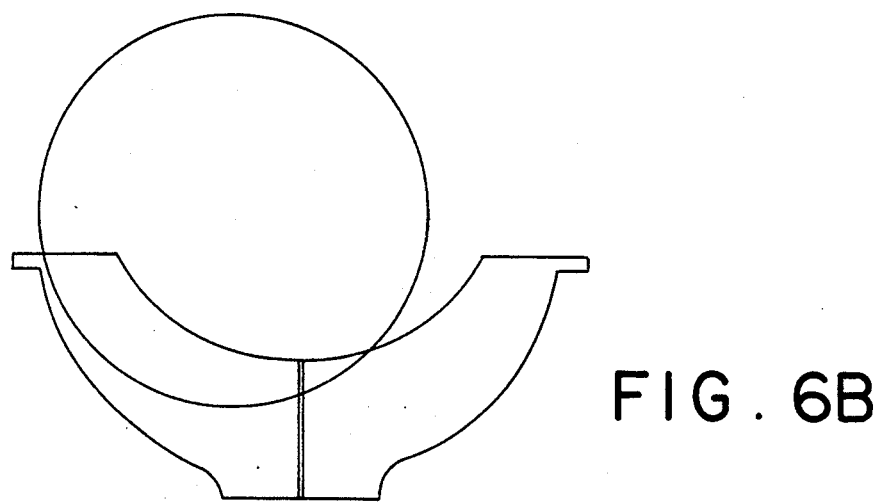

FIGS. 6a and 6b are comparative drawings of a tire according to the embodiment of FIG. 1 and a tire according to the prior art as exemplified by GB No. 1125738 and illustates the degree of wear that is available to a pulley rope in a tire according to the embodiment as shown at FIGS. 6a compared to the pulley tire of GB1125738.

Furthermore because of the integral nature of the tire the wear of the tire is improved over that of GB1125738 which provides for an interface between two tire halves which is substantially unsupported and as a result of that lack of support will lead to fracturing of the tire material at the interface between the tire halves and the peripheral groove. Furthermore when the life of the tire of the present embodiment has been completed it is merely necessary to disassemble the pulley to remove the worn tire and reinsert a new tire. In the case of the prior art is exemplified by GB No. 1125738 it is necessary to remove each of the rim halves, remove the elastomeric material which forms the tire halves and which is bonded to each of the rim halves and then remould fresh material to form each tire half on each rim half.

It should be appreciated that the scope of the present invention need not be limited to the particular scope of the embodiment described above.

What is claimed is:

1. A pulley comprising:
a hub having a substantially cylindrical outer face and a pair of rim halves adapted to be mounted to the hub and having opposed inner axial faces which are divergent with respect to each other, a separatable pulley tyre having a cross-sectional configuration corresponding substantially to the space defined between the hub and the inner axial faces of the rim halves and having an inner circumference whereby the tyre is snugly received on the hub and is clampingly received between the rim halves, said tyre having a reinforcing ring located at or adjacent the inner circumference of the tyre, the outer circumference of the tyre being formed with a peripheral groove for accommodation of a pulley or cable.

2. A pulley as recited in claim 1 wherein the tyre is formed from an elastomeric material.

3. A pulley as recited in claim 2 wherein a layer of elastomeric material is located between the inner circumference of the reinforcing ring and the inner circumference of the tyre.

4. A pulley as recited in claim 3 wherein the layer of elastomeric material has a greater resilience than the elastomeric material forming the pulley tyre.

5. A pulley as recited in claim 4 wherein the axial faces of the tyre are formed of an elastomeric material of contrasting color to the elastomeric material forming the body of the tyre to indicate wear.

6. A pulley as recited in claim 5 wherein the outer axial faces of the tyre are formed of an elastomeric material having a greater hardness than the elastomeric material forming the body of the tyre.

7. A pulley as recited in claim 6 wherein the reinforcing ring is formed of an elastomeric material of similar composition to that of the tyre but having a greater hardness.

8. A pulley as recited in claim 7 wherein the reinforcing ring extends over the inner circumference of the tyre and partially over each axial face.

9. A pulley as recited in claim 5 wherein the reinforcing ring is formed of an elastomeric material of similar composition to that of the tyre but having a greater hardness.

10. A pulley as recited in claim 9 wherein the reinforcing ring extends over the inner circumference of the tyre and partially over each axial face.

11. A pulley as recited in claim 4 wherein the reinforcing ring is formed of an elastomeric material of similar composition to that of the tyre but having a greater hardness.

12. A pulley as recited in claim 11 wherein the reinforcing ring extends over the inner circumference of the tyre and partially over each axial face.

13. A pulley as recited in claim 3 wherein the axial faces of the tyre are formed of an elastomeric material of contrasting color to the elastomeric material forming the body of the tyre to indicate wear.

14. A pulley as recited in claim 13 wherein the outer axial faces of the tyre are formed of an elastomeric material having a greater hardness than the elastomeric material forming the body of the tyre.

15. A pulley as recited in claim 14 wherein the reinforcing ring is formed of an elastomeric material of similar composition to that of the tyre but having a greater hardness.

16. A pulley as recited in claim 15 wherein the reinforcing ring extends over the inner circumference of the tyre and partially over each axial face.

17. A pulley as recited in claim 3 wherein the reinforcing ring is formed of an elastomeric material of similar composition to that of the tyre but having a greater hardness.

18. A pulley as recited in claim 17 wherein the reinforcing ring extends over the inner circumference of the tyre and partially over each axial face.

19. A pulley as recited in claim 13 wherein the reinforcing ring is formed of an elastomeric material of similar compostion to that of the tyre but having a greater hardness.

20. A pulley as recited in claim 19 wherein the reinforcing ring extends over the inner circumference of the tyre and partially over each axial face.

21. A pulley as recited in claim 24 wherein the outer axial faces of the tyre are formed of an elastomeric material having a greater hardness than the elastomeric material forming the body of the tyre.

22. A pulley as recited in claim 21 wherein the reinforcing ring is formed of an elastomeric material of similar composition to that of the tyre but having a greater hardness.

23. A pulley as recited in claim 22 wherein the reinforcing ring extends over the inner circumference of the tyre and partially over each axial face.

24. A pulley as recited in claim 2 wherein the axial faces of the tyre are formed of an elastomeric material of contrasting color to the elastomeric material forming the body of the tyre to indicate wear.

25. A pulley as recited in claim 24 wherein the reinforcing ring is formed of an elastomeric material of similar composition to that of the tyre but having greater hardness.

26. A pulley as recited in claim 25 wherein the reinforcing ring extends over the inner circumference of the tyre and partially over each axial face.

27. A pulley as recited in claim 2 wherein the reinforcing ring is formed of an elastomeric material of similar composition to that of the tyre but having a greater hardness.

28. A pulley as recited in claim 27 wherein the reinforcing ring extends over the inner circumference of the tyre and partially over each axial face.

29. A pulley as recited in claim 2 wherein the axial faces of the tyre are formed of an elastomeric material having a greater strength or hardness than the elastomeric material forming the main body of the tyre and a further layer of elastomeric material is located between the inner circumference of the tyre and the reinforcing ring and is formed of a material having a differing hardness from the main body of the tyre.

30. A pulley as recited in claim 1 wherein a layer of elastomeric material is located between the inner circumference of the reinforcing ring and the inner circumference of the tyre.

31. A pulley as recited in claim 30 wherein the layer of elastomeric material has a greater resilience than the elastomeric material forming the pulley tyre.

32. The pulley as recited in claim 1 wherein the cross sectional area of the peripheral groove is less than half of the overall cross sectional area of the tyre.

33. The pulley as recited in claim 1 wherein the peripheral groove is located to one side of the outer circumference of the tyre.

34. A pulley tyre which is receivable on a hub, said hub having a substantially cylindrical outer face, and between a pair of rim halves which are adapted to be mounted to each axial face of the hub whereby the opposed inner axial faces of the rim halves are in opposed relation to each other and are divergent with respect to each other, said tyre having an inner circumference whereby the tyre is snugly received over the hub and the lateral dimensions of the tyre being such that the tyre is clampingly received between the rim halves, said tyre being formed of an elastomeric material and having a reinforcing ring located at or adjacent the inner circumference of the tyre, the outer circumference of the tyre being formed with a peripheral groove which is adapted to receive a rope or cable.

35. A pulley tyre as recited in claim 34 wherein the cross sectional area of the peripheral groove is less than half of the overall cross sectional area of the tyre.

36. A pulley tyre as recited in claim 35 wherein the peripheral groove is located to one side of the outer circumference of the tyre.

37. A pulley tyre as recited in claim 36 wherein the cross sectional configuration of the tyre is substantially trapezoidal and the cross sectional configuration of the peripheral groove is substantially circular.

38. A pulley tyre as recited in claim 37 wherein a layer of elastomeric material is located between the inner circumference of the reinforcing ring and the inner circumference of the tyre.

39. A pulley tyre as recited in claim 35 wherein the layer of elastomeric material has a greater resilience than the elastomeric material forming the pulley tyre.

40. A pulley tyre as recited in claim 36 wherein a layer of elastomeric material is located between the inner circumference of the reinforcing ring and the inner circumference of the tyre.

41. A pulley tyre as recited in claim 40 wherein the layer of elastomeric material has a greater resilience than the elastomeric material forming the pulley tyre.

42. A pulley tyre as recited in claim 35 wherein the cross sectional configuration of the tyre is substantially trapezoidal and the cross sectional configuration of the peripheral groove is substantially circular.

43. A pulley tyre as recited in claim 42 wherein a layer of elastomeric material is located between the inner circumference of the reinforcing ring and the inner circumference of the tyre.

44. A pulley tyre as recited in claim 43 wherein the layer of elastomeric material has a greater resilience than the elastomeric material forming the pulley tyre.

45. A pulley tyre as recited in claim 35 wherein a layer of elastomeric material is located between the inner circumference of the reinforcing ring and the inner circumference of the tyre.

46. A pulley tyre as recited in claim 45 wherein the layer of elastomeric material has a greater resilience than the elastomeric material forming the pulley tyre.

47. A pulley tyre as recited in claim 34 wherein the peripheral groove is located to one side of the outer circumference of the tyre.

48. A pulley tyre as recited in claim 47 wherein the cross sectional configuration of the tyre is substantially trapezoidal and the cross sectional configuration of the peripheral groove is substantially circular.

49. A pulley tyre as recited in claim 47 wherein a layer of elastomeric material is located between the inner circumference of the reinforcing ring and the inner circumference of the tyre.

50. A pulley tyre as recited in claim 49 wherein the layer of elastomeric material has a greater resilience than the elastomeric material forming the pulley tyre.

51. A pulley tyre as recited in claim 48 wherein a layer of elastomeric material is located between the inner circumference of the reinforcing ring and the inner circumference of the tyre.

52. A pulley tyre as recited in claim 51 wherein the layer of elastomeric material has a greater resilience than the elastomeric material forming the pulley tyre.

53. A pulley tyre as recited in claim 34 wherein the cross sectional configuration of the tyre is substantially trapezoidal and the cross sectional configuration of the peripheral groove is substantially circular.

54. A pulley tyre as recited in claim 53 wherein a layer of elastomeric material is located between the inner circumference of the reinforcing ring and the inner circumference of the tyre.

55. A pulley tyre as recited in claim 54 wherein the layer of elastomeric material has a greater resilience than the elastomeric material forming the pulley tyre.

56. A pulley tyre as recited in claim 34 wherein a layer of elastomeric material is located between the inner circumference of the reinforcing ring and the inner circumference of the tyre.

57. A pulley tyre as recited in claim 34 wherein the axial faces of the tyre are formed of an elastomeric material of contrasting color to the elastomeric material forming the body of the tyre.

58. A pulley tyre as recited in claim 57 wherein the outer axial faces of the tyre are formed of an elastomeric material having a greater hardness than the elastomeric material forming the body of the tyre.

59. A pulley tyre as recited in claim 58 further comprising a layer of elastomeric material located between the inner circumference of the tyre and the reinforcing ring, said layer having a hardness differing from the main body of the tyre.

60. A pulley tyre as recited in claim 34 wherein the reinforcing ring is formed of an elastomeric material of similar composition to that of the tyre but having a greater hardness.

61. A pulley tyre as recited in claim 60 wherein the reinforcing ring extends over the inner circumference of the tyre and partially over each axial face.

* * * * *